United States Patent [19]

Kawanami et al.

[11] Patent Number: 4,509,090

[45] Date of Patent: Apr. 2, 1985

[54] COAXIAL LIGHTNING ARRESTING STRUCTURE

[75] Inventors: Norihide Kawanami; Yukinori Miyake; Kenji Kawamura, all of Tokyo; Toshiharu Toda, Mitaka, all of Japan

[73] Assignees: Hirose Electric Co., Ltd., Tokyo; Mito Teck O., Ltd., Ibaragi, both of Japan

[21] Appl. No.: 505,852

[22] Filed: Jun. 20, 1983

[30] Foreign Application Priority Data

Jun. 23, 1982 [JP] Japan ............................... 57-107779

[51] Int. Cl.$^3$ ............................................... H02H 9/06

[52] U.S. Cl. ..................................... 361/119; 361/120

[58] Field of Search ............... 361/117, 119, 120, 110, 361/111

[56] References Cited

U.S. PATENT DOCUMENTS

| | | | |
|---|---|---|---|
| 2,886,744 | 5/1959 | McNatt, Jr. | 361/119 |
| 3,274,447 | 9/1966 | Nelson | 361/119 |
| 3,863,111 | 1/1975 | Martzloff | 361/119 |
| 4,021,759 | 5/1977 | Campi | 361/119 X |
| 4,145,729 | 3/1979 | Hayward | 361/119 |
| 4,359,764 | 11/1982 | Block | 361/119 |
| 4,467,390 | 8/1984 | Carpenter, Jr. | 361/120 X |

*Primary Examiner*—Harry E. Moose, Jr.
*Attorney, Agent, or Firm*—Fleit, Jacobson, Cohn & Price

[57] ABSTRACT

There is disclosed a coaxial lightning arresting structure comprising an inner conductor, an outer conductor surrounding the inner conductor and an arrester tube located between the inner and outer conductors perpendicularly to the direction of transmission and connected at its ends to the inner and outer conductors, respectively. The portion of the inner conductor provided with the arrester tube has a reduced effective sectional area as compared with the other portions of the inner conductor so that the ratio of the outer conductor inner diameter to the outer diameter of the inner conductor portion having the reduced effective sectional area is greater than the ratio of the outer conductor inner diameter to the inner conductor outer diameter at the other portions of the inner conductor which latter ratio provides the coaxial transmission line with a given characteristic impedance.

6 Claims, 10 Drawing Figures

COAXIAL LIGHTNING ARRESTING STRUCTURE

This invention relates to a lightning arresting device, and more specifically to a coaxial lightning arresting structure for use in coaxial transmission lines.

Heretofore, protectors or lightning arresters having a structure like that shown in FIG. 1 have been generally used in signal transmission lines. The arrester shown comprises a base plate 1 having an input signal terminal 2, an output signal terminal 3 and a grounding pin 4 which are fixed thereto and extend therethrough. The arrester also has a cap 5 fitted on the base plate 1. A gas filled type arrester tube 6 is located in a space defined by the base plate 1 and the cap 5, and a lower electrode 7 of the arrester tube 6 is put on and contacted with an upper end portion of the grounding pin 4. The arrester tube 6 has an upper electrode 8 in addition to the electrode 7. These electrodes 7 and 8 are supported by a ceramic tube 9 to leave therebetween a gap 10 which is set to provide a desired discharge start voltage. The upper electrode 8 is contacted with a pair of conductive springs 11 and 12 extending respectively from the upper end portions of the signal terminals 2 and 3 so that these signal terminals 2 and 3 are connected to each other by the electrode 8.

The aforementioned device constitutes one arrester unit, and the arrester comprises a pair of such arrester units so that it can be used for a two-conductor transmission line. An equivalent circuit of such an arrester is shown in FIG. 2.

When the arrester as mentioned above is applied to a transmission line, a pair of signal wires in the transmission line are interrupted and the signal terminals 2 and 3 of an arrester are connected to each of the interrupted signal wires to restore the electrical continuity thereof. At the same time, the grounding pins 4 of the arrester are earthed. In normal operation, a signal transmitted through the signal wire is inputted from the input signal terminal 2 of the arrester through the conductive spring 11 and the electrode 8 of the arrester tube and is outputted through the conductive spring 12 and the output signal terminal 3 so as to be returned to the signal wire. However, if lightning strikes near the transmission line, a high voltage surge current induced in the transmission line will flow through the signal wire to the input signal terminal 2 of the arrester. The high voltage surge current is guided through the conductive spring 11 to the electrode 8 where it causes electric discharge between the electrodes 7 and 8 separated by the gap 10. As a result, the surge current will be dispersed into the earth through the grounding pin 4. Therefore, no surge current is returned through the output signal terminal 3 to the transmission line so that electronic instruments connected to the transmission line are protected from the surge current.

The aforementioned arrester is suitable for transmission lines for signals of a few thousand Hertz, but cannot be used for a high-frequency coaxial signal transmission line. The reason for this is that: First, the overall arrester has a considerable amount of capacitance. Second, if the arrester as shown is applied for the coaxial transmission line, it is necessary to provide a drawing-out conductor extending from at least a central conductor of the coaxial line and to connect the drawing-out conductor to the signal terminal of the arrester. However, this inevitably makes the connection very complicated and will greatly change the impedance of the coaxial line, which becomes a cause for reflection in the transmission line. For these reasons, there has heretofore been no arrester which could be used in a high-frequency coaxial signal transmission line.

Accordingly, an object of this invention is to provide a small-sized and inexpensive lightning arresting structure which can be used in a coaxial signal transmission line and which has sufficient high-frequency characteristics.

The inventors of this invention considered locating an arrester tube in a coaxial line but not providing an arrester exterior of the coaxial line. However, a coaxial line is a distributed constant circuit. Therefore, if an arrester tube having some amount of capacitance is connected to the coaxial line, that portion of the coaxial line to which the arrester tube is connected will have a capacitance different from that of the other portions of the coaxial line, so that the characteristic impedance will be changed in that portion. This is a cause for reflection in the transmission line and impairs the voltage standing wave ratio (VSWR) of the transmission line.

Now, considering a coaxial line as shown in FIG. 3, which comprises an inner conductor having an outer diameter of "Ao" and an outer conductor having an inner diameter of "bo", the characteristic impedance Zo is expressed as follows:

$$Zo = \sqrt{\frac{Lo}{Co}}$$

where $$Lo = \frac{\mu}{2\pi} \log_e \frac{bo}{Ao} \ [H/m]$$

$$Co = \frac{2\pi\epsilon}{\log_e \frac{bo}{Ao}} \ [F/m]$$

$\mu$: permeability $\epsilon$=dielectric constant

Furthermore, considering a specific coaxial line having the characteristic impedance of 50 ohms, it has for example the following Lo and Co:

Lo=0.00135 $\mu$H/m

Co=0.52 pF/m

In such a coaxial line, if an arrester tube 20 having at least a few picofarads of capacitance is located as shown in dotted lines in FIG. 3, the capacitance will be increased in that portion where the arrester tube is located. For example, assuming that the arester tube 20 has a capacitance of 2.5 pF, that portion of the coaxial line provided with the arrester tube will have a capacitance of about 3 pF, which is six times the capacitance of a coaxial line provided with no arrester tube. As a result, the portion of the coaxial line provided with the arrester tube will have a characteristic impedance of about 20 ohms.

Thus, the inventors of this invention have made a unique contrivance for compensating for the increase in the electrostatic capacitance caused by provision of an arrester tube in a coaxial transmission line.

Namely, according to this invention there is provided a coaxial lightning arresting structure comprising an inner conductor, an outer conductor surrounding the inner conductor and an arrester tube located between the inner and outer conductors perpendicularly to the direction of transmission and connected at its ends to the inner and outer conductors, respectively, the portion of said inner conductor provided with the arrester tube having a reduced effective sectional area as compared with the other portions of the inner conductor so that the ratio of the outer conductor inner diameter to the outer diameter of said inner conductor portion having the reduced effective sectional area is greater than the ratio of the outer conductor inner diameter to the inner conductor outer diameter at the other portions thereof which latter said ratio provides the coaxial transmission line with a given characteristic impedance.

With the above arrangement, the coaxial structure portion having the inner conductor of the reduced effective sectional area has an increased inductance and a somewhat decreased capacitance. Therefore, the increase in electrostatic capacitance in the coaxial transmission line portion provided with the arrester tube is compensated for by the increase in inductance and the decrease in capacitance in the coaxial structure itself of the portion provided with the arrester tube, so that the coaxial transmission line portion provided with the arrester tube can have substantially the same characteristic impedance as that of the other portions. In addition, it is very easy to machine the inner conductor to give it a reduced effective sectional area. Furthermore, the provision of the arrester tube between the outer conductor and the inner conductor of the reduced sectional area needs no additional parts and makes the coaxial arresting structure simple, small and inexpensive.

In one embodiment of this invention, the inner conductor portion having the reduced effective sectional area is a cut-out portion of the inner conductor. Preferably, the cut-out portion has a flat bottom surface parallel to the center axis of the inner conductor. With this construction, since the arrester tube can be put on the bottom of the cut-out portion in a stable condition, the arrester can be located within the coaxial transmission line in a steady condition. Furthermore, the electrode of the arrester tube is in contact with the inner conductor with a large contacting area. In addition, since the arrester tube is put within the cut-out portion, the radial size of the coaxial arresting structure can be made small so that the coaxial arresting structure can be small-sized as a whole. The electrode of the arrester tube in contact with the cut-out inner conductor portion acts as the inner conductor so as to decrease the degree to which the arrester tube hinders the propagating wave in the coaxial transmission line.

In another embodiment of this invention, the inner conductor having the reduced effective sectional area is a reduced diameter portion of the inner conductor. In this case, it is easier to machine the inner conductor.

In the above two embodiments, the outer conductor portion surrounding the inner conductor portion of the reduced effective sectional area has an arrester tube insertion hole formed therein perpendicularly to the direction of transmission so that the arrester tube can be inserted in the insertion hole in such a manner that one electrode of the arrester tube is brought into contact with the inner conductor portion. A conductive spring is put on the other electrode of the arrester tube thus located in the insertion hole of the outer conductor, and a conductive screw cap is screwed into the insertion hole so that the conductive spring is brought into resilient contact with the other electrode of the arrester tube and the conductive cap. As a result, the other electrode of the arrester tube is connected to the outer conductor through the conductive spring and the conductive cap. With the procedures as mentioned above, the arrester tube can easily installed in the coaxial transmission line.

The above and other objects and advantages of this invention will become apparent from the following detailed description of preferred embodiments of this invention with reference to the accompanying drawings, in which.

Figure 1:
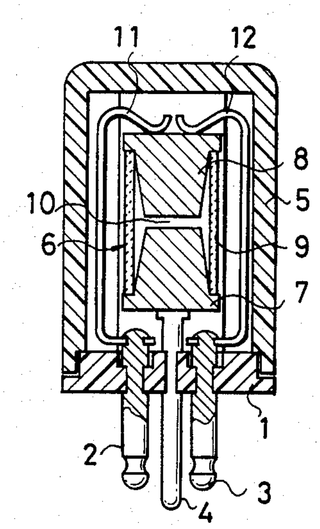
FIG.1 PRIOR ART
FIG. 1 is sectional view of the conventional arrester.
Figure 2:
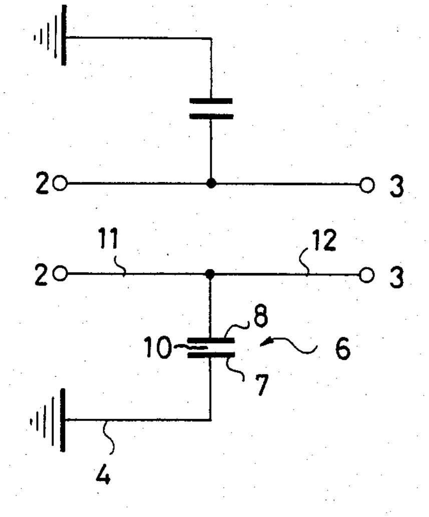
FIG.2 PRIOR ART
FIG. 2 shows the equivalent circuit of the arrester shown in FIG. 1.
Figure 3:
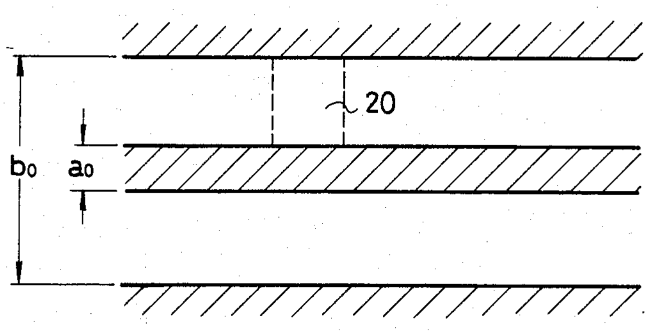
FIG. 3 is a diagramatic sectional view of an exemplary coaxial line.
Figure 4:
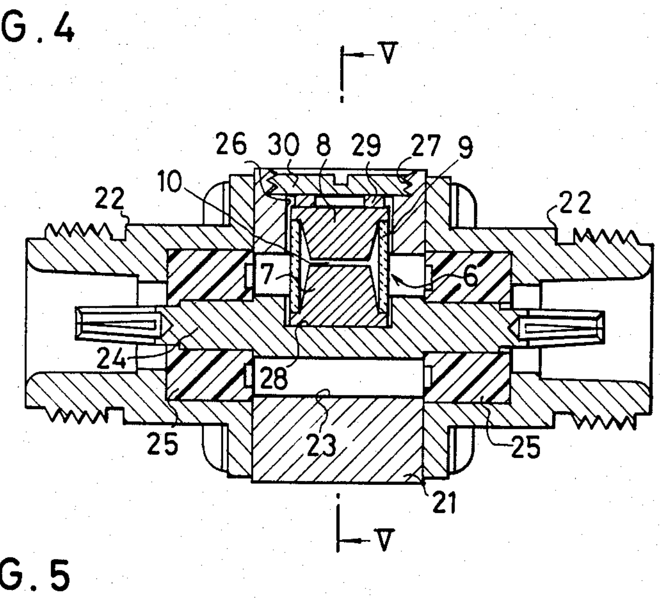
FIG. 4 is a longitudinal sectional view of a first embodiment of the coaxial lightning arresting structure in accordance with this invention.
Figure 5:
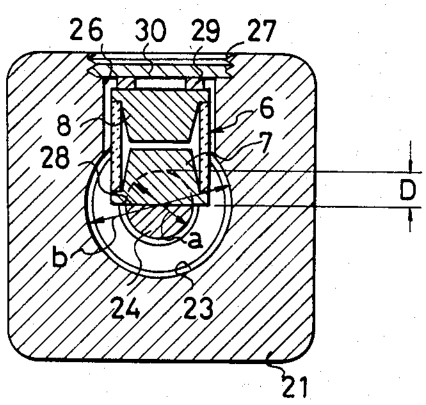
FIG. 5 is a sectional view taken along the line V—V in FIG. 4.

Referring to FIGS. 4 and 5, there is shown a coaxial connector incorporating therein the coaxial lightning arresting structure in accordance with this invention. The shown connector type coaxial arresting structure has an outer conductor 21 connected to and supported by metallic coaxial connector portions 22 which are provided at opposite ends of the outer conductor 21 and are adapted to be coupled with mating connectors (not shown). The outer conductor 21 has a circular through-hole 23 of an inner diameter "b". An inner conductor 24 is located to coaxially extend through the hole 23 of the outer conductor 21 and is supported at each end by one of the connector portions 22 via a dielectric member 25 which acts as a support and separator. The inner conductor 24 has an outer diameter "a" in the portion between the pair of the connector portions 22.

As shown in the drawings, the outer conductor 21 is of a considerable thickness and has an arrester tube insertion through-hole 26 formed in an upper portion thereof. The inner diameter of the through-hole 26 is slightly larger than the outer diameter of the gas filled arrester tube 6 inserted therein. The insertion hole 26 has a female-threaded portion 27 formed in an upper portion thereof. On the other hand, the inner conductor 24 has a cut-out portion 28 formed at a position corresponding to the insertion hole 26. This cut-out portion 28 has a transmission direction length substantially the same as or slightly longer than the outer diameter of the arrester tube 6. The cut-out portion 28 has a flat bottom forming a plane parallel to the center axis of the inner conductor 24 and perpendicular to the center axis of the through-hole 26. The cut-out portion 28 also has a depth "D" sufficient to provide an inductance increase and a capacitance decrease in the coaxial structure itself, the degree of increase and decrease being necessary and sufficient for compensating for the increase in capacitance in the coaxial transmission line caused by provision of the arrester tube. This depth "D" can be determined experimentally.

The arrester tube 6 is inserted into the insertion hole 26 and positioned in the cut-out portion of the inner conductor so that a lower electrode 7 of the arrester tube 6 is brought into contact with the bottom of the cut-out portion of the inner conductor 24. A conductive spring washer 29 is put on an upper electrode 8 of the arrester tube 6 and a conductive screw cap 30 is screwed in the threaded portion 27 of the insertion hole 26 so that it downwardly pushes the upper electrode 8 of the arrester tube 6 through the spring washer 29. Thus, the lower electrode 7 of the arrester tube 6 is electrically connected to the inner conductor 24, and the upper electrode 8 of the arrester tube 6 is electrically connected to the outer conductor 21 through the spring washer 29 and the conductive cap 30.

Figure 6:
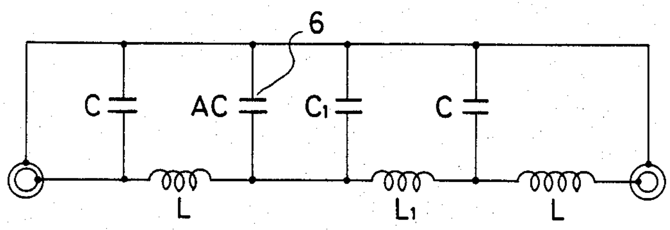
FIG. 6 shows the equivalent circuit of the device shown in FIGS. 4 and 5.

FIG. 6 shows the equivalent circuit of the coaxial arresting structure described above. It will be noted that the addition of the capacitance "AC" to the coaxial line constituting a distributed constant circuit consisting of L and C by the provision of the arrester tube 6 is compensated for by an increased inductance $L_1$ and a somewhat decreased capacitance $C_1$ given by the cut-out portion 28 in the coaxial structure portion to be provided with the arrester tube, whereby the impedance in the coaxial transmission portion provided with the arrester tube is prevented from changing.

Figure 7:
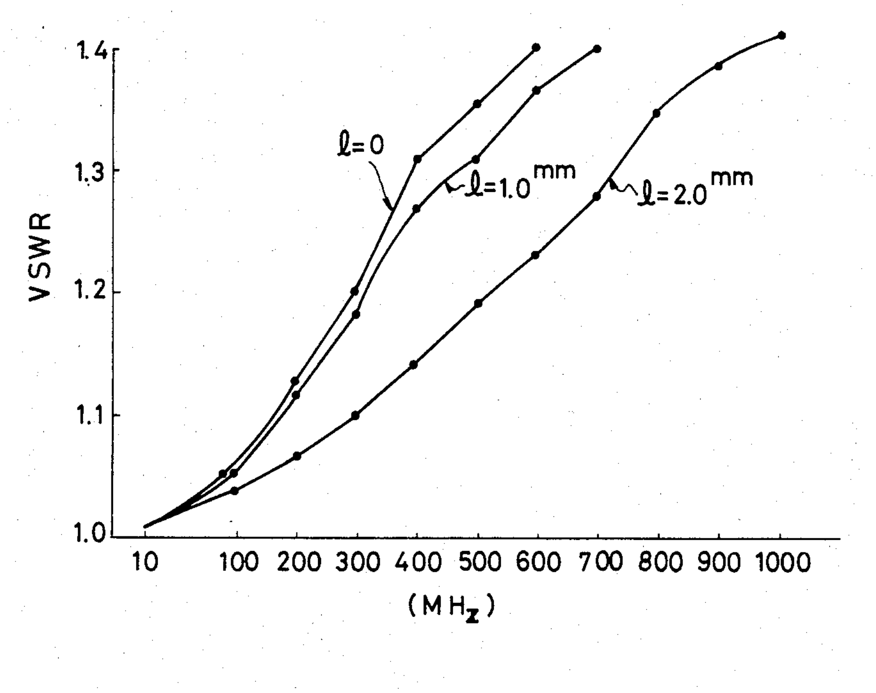
FIG. 7 is a graph showing the relation between the depth of the cut-out portion and the VSWR in the embodiment shown in FIGS. 4 and 5.

FIG. 7 is a graph showing the relation between the depth of the cut-out portion and the voltage standing wave ratio (VSWR) in the case that a gas filled arrester tube having an outer diameter of 8 mm, a length of 9.5 mm and a capacitance of 2.5 pF is applied to the coaxial structure as shown in FIGS. 4 and 5 having the characteristic impedance of 50 ohms and comprising the outer conductor having an inner diameter of 10 mm and the inner conductor having an outer diameter of 5 mm and formed with a cut-out portion of the depths 0 mm, 1 mm, and 2 mm, respectively. It will be seen from this graph that the greater the depth of the cut-out portion is, the better is the VSWR.

Figure 8:
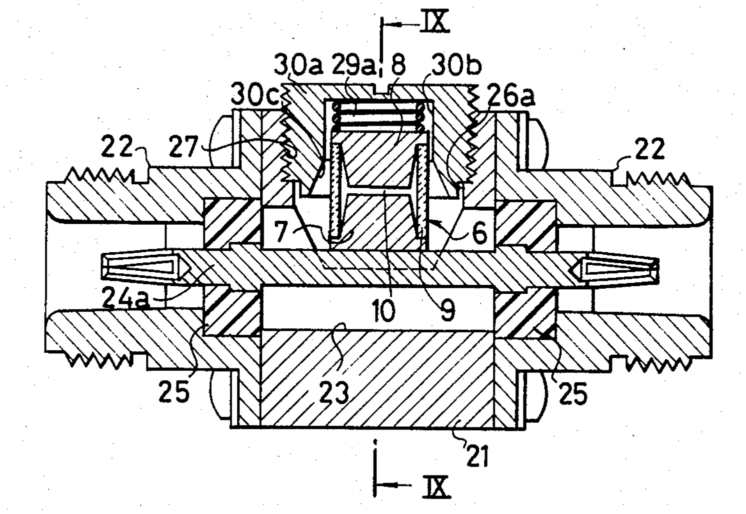
FIG. 8 is a longitudinal sectional view of a second embodiment of the coaxial lightning arresting structure.
Figure 9:
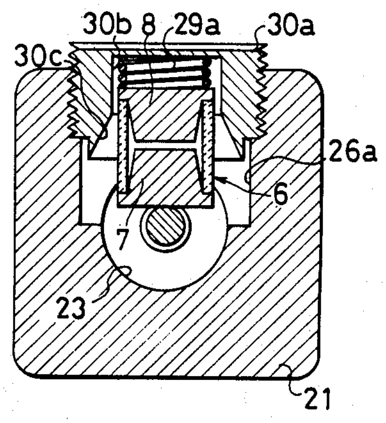
FIG. 9 is a sectional view taken along the line IX—IX in FIG. 8.

FIGS. 8 and 9 shows a modification of the embodiment shown in FIGS. 4 and 5. Therefore, the same portions are given the same Reference Namerals and explanation thereof will be omitted.

This coaxial arresting structure is different from the first embodiment shown in FIGS. 4 and 5 in that it comprises an inner conductor 24*a* thinner than the inner conductor 24 in the first embodiment, and an arrester tube insertion hole 26*a* which is larger than the insertion hole 26 in the first embodiment and which extends to a position corresponding to the center axis of the inner conductor 24*a* as shown in FIG. 9. In addition, a screw cap 30*a* is in the form of a cylindrical member having a hole 30*b* open to the lower end and adapted to accommodate therein a portion of the arrester tube. The hole 30*b* has a tapered surface 30*c* formed at the lower portion thereof to diverge downwardly. Instead of the spring washer 29, a conductive spring coil 29*a* is located between the upper electrode of the arrester tube and the screw cap 30*a*.

Figure 10:
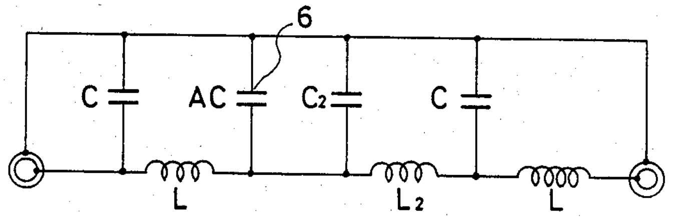
FIG. 10 shows the equivalent circuit of the device shown in FIGS. 8 and 9.

With the above construction, the inner conductor 24*a* has a reduced effective sectional area, and the distance between the center axis of the inner conductor 24*a* and the surface of the portion in the neighborhood of the arrester tube and acting as the outer conductor is large. Therefore, as seen from FIG. 10 showing the equivalent circuit of the arresting structure shown in FIGS. 8 and 9, the thin inner conductor 22*a* provides an increased inductance $L_2$ and a somewhat decreased capacitance $C_2$ in the coaxial structure portion to be provided with the arrester tube, so that the increased inductance and the decreased capacitance compensate for the addition of the capacitance "AC" by the provision of the arrester tube.

In the above explanation, this invention has been described with reference to a connector type coaxial lightning arresting structure, but it will be apparent to those skilled in the art that this invention can also be applied to ordinary coaxial lines or circuits.

We claim:

1. A coaxial lightning arresting structure comprising an inner conductor, an outer conductor surrounding the inner conductor and an arrester tube located between the inner and outer conductors perpendicularly to the direction of transmission and connected at its ends to the inner and outer conductors, respectively, the portion of said inner conductor provided with the arrester tube having a reduced effective sectional area as compared with the other portions of the inner conductor so that the ratio of the outer conductor inner diameter to the outer diameter of said inner conductor portion having the reduced effective sectional are is greater than the ratio of the outer conductor inner diameter to the inner conductor outer diameter at the other portions thereof, which latter said ratio provides the coaxial transmission line with a given characteristic impedance.

2. A coaxial lightning arresting structure according to claim 1 wherein said inner conductor portion having the reduced effective sectional area is a cut-out portion of the inner conductor.

3. A coaxial lightning arresting structure according to claim 2 wherein said cut-out portion of the inner conductor has a transmission direction length not shorter than the outer diameter of the arrester tube and a flat bottom parallel to the center axis of the inner conductor so that the arrester tube is positioned in said cut-out portion.

4. A coaxial lightning arresting structure according to claim 3 wherein the outer conductor portion surrounding said cut-out portion of the inner conductor has an arrester insertion hole formed therein perpendicularly to the direction of transmission and having an inner diameter slightly larger than the outer diameter of the arrester tube so that the arrester tube can be inserted in the insertion hole in such a manner that one electrode of the arrester tube is positioned in said cut-out portion of the inner conductor and is brought into contact with the bottom of said cut-out portion, and wherein a conductive spring is put on the other electrode of the arrester tube thus located in the insertion hole of the outer conductor, and a conductive screw cap is screwed into the hole so that the conductive spring is brought into resilient contact with the other electrode of the arrester tube and the conductive cap whereby the other electrode of the arrester tube is connected to the outer conductor through the conductive spring and the conductive cap.

5. A coaxial lightning arresting structure according to claim 1 wherein said inner conductor portion having the reduced effective sectional area is a reduced diameter portion of the inner conductor.

6. A coaxial lightning arresting structure according to claim 5 wherein the outer conductor portion surrounding said reduced diameter portion of the inner conductor has an arrester insertion hole formed therein perpendicularly to the direction of transmission and having an inner diameter larger than the outer diameter of the arrester tube so that the arrester tube can be inserted in the insertion hole in such a manner that one electrode of the arrester tube is positioned on and brought into contact with said reduced diameter portion of the inner conductor, and wherein a conductive spring is put on the other electrode of the arrester tube thus located in the insertion hole of the outer conductor, and a conductive screw cap is screwed into the hole so that the conductive spring is brought into resilient contact with the other electrode of the arrester tube and the conductive cap whereby the other electrode of the arrester tube is connected to the outer conductor through the conductive spring and the conductive cap.

* * * * *